March 11, 1930.  C. M. AKINS  1,750,085
APPARATUS FOR REGULATING A HEATING MEANS
Filed Nov. 4, 1927   3 Sheets-Sheet 1

INVENTOR
CLIFFORD M. AKINS
BY HIS ATTORNEYS

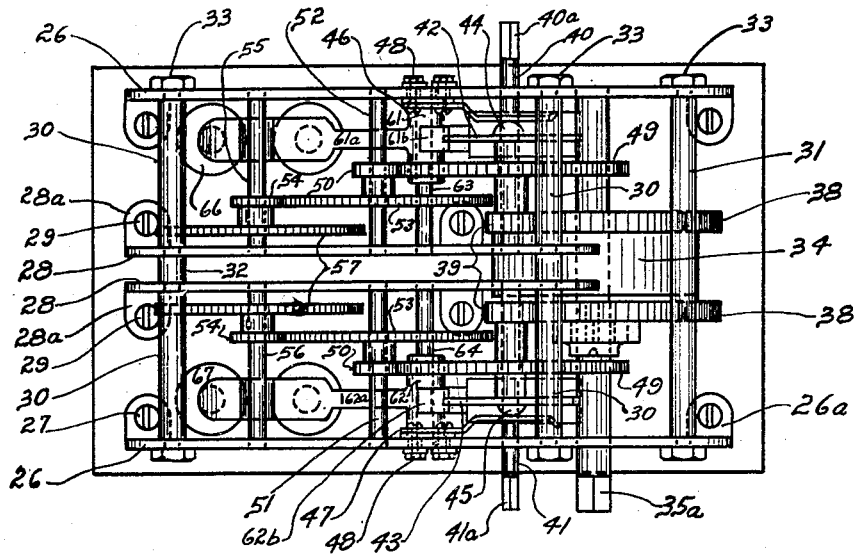
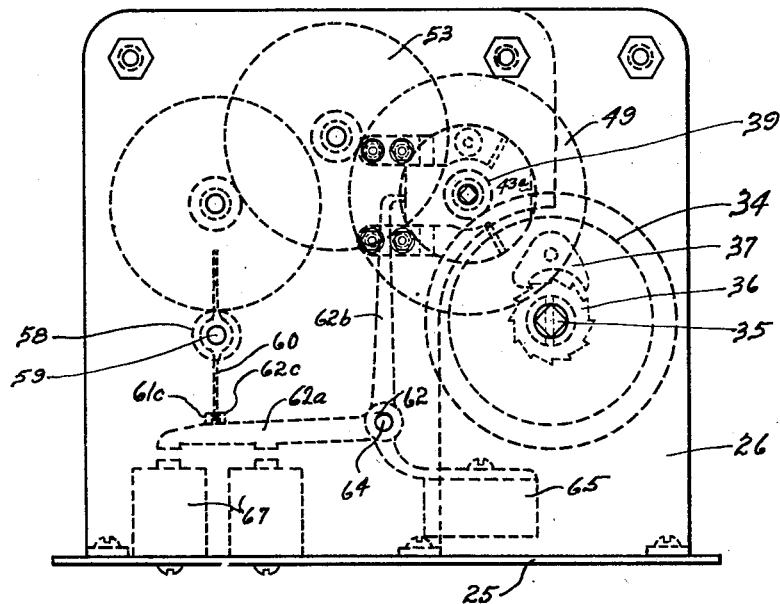

INVENTOR
CLIFFORD M. AKINS
BY HIS ATTORNEYS

Patented Mar. 11, 1930

1,750,085

UNITED STATES PATENT OFFICE

CLIFFORD M. AKINS, OF MINNEAPOLIS, MINNESOTA

APPARATUS FOR REGULATING A HEATING MEANS

Application filed November 4, 1927. Serial No. 231,037.

This invention relates to apparatus for regulating the temperature of a room which is heated by a furnace or other heating means having a draft control, a damper, and a check control or damper. It is now quite a common practice to control such a furnace or heating means by means of a thermostat placed in the rooms to be heated. The thermostat is provided with a pair of contacts adapted to control electrical circuits which in turn control a motor having connections to the draft damper and check damper of the furnace. When the temperature in the room rises above a certain point, a circuit is closed to operate the motor to close the draft damper and open the check damper. When the temperature falls below a certain point, a circuit is closed for controlling the motor to close the check damper and open the draft damper. There are thus just two stages in the regulation. In one of these the furnace has an open draft and closed check, and with the other it has a closed draft and open check.

It is an object of this invention to provide a means of regulating a furnace for controlling the temperature in the room, by means of which the furnace is regulated in several stages. When it is desired to bring the temperature of a room up to a certain point, the furnace will be in one stage with an open draft and closed check. When the temperature exceeds said point, the device will be operated to bring the furnace to another stage with the closed draft and open check. If the temperature now falls the device will operate to bring the furnace to another stage which will be with the closed draft and closed check. If the temperature continues to fall after this stage, the furnace will again be brought to the stage first mentioned, with the open draft and closed check.

It is another object of the invention to provide an apparatus for regulating a furnace, including a thermostat having three sets of contacts, each closing an electrical circuit to in turn control a motor, one of said circuits when closed controlling the motor so that with a closed draft and open check the check will be closed without changing the draft. When another circuit is closed, the draft will be opened and the check left closed. When another circuit is closed, the draft will be closed and the check opened.

These and other objects and advantages of the invention will be fully set forth in the following description made in connection with the accompanying drawings, in which like reference characters refer to similar parts throughout the several views and in which:—

Fig. 3 is a plan view of the motor used;

Fig. 4 is a view in side elevation of said motor; and

Figure 1:
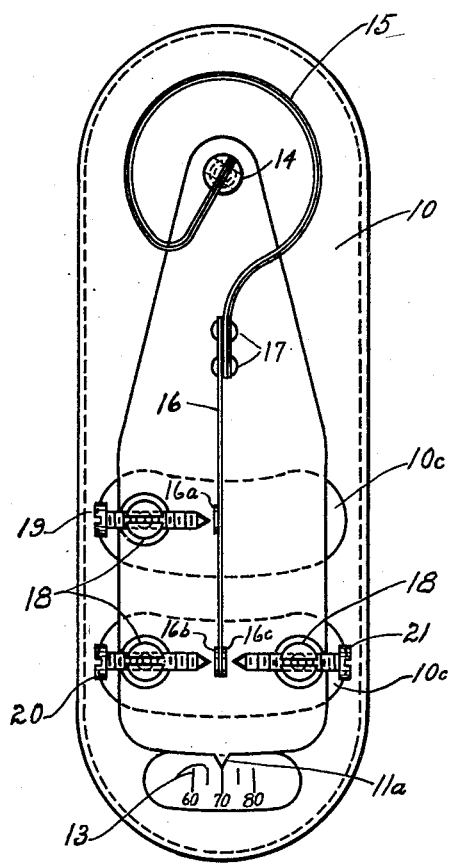
Fig. 1 is a view in front elevation of the thermostat used.

Referring to the drawings, a thermostat is shown comprising an oblong casing 10 preferably made of sheet metal and having a surrounding flange 10$^a$. The casing 10 has mounted thereon a plate 11 secured by and movable about the screw 12. Said plate 11 has a pointer 11$^a$ formed centrally thereof at its bottom, adapted to co-operate with a set of graduations 13 formed on the front of casing 10. While these graduations may be variously numbered, in the embodiment of the invention illustrated they are shown as numbered from 60 to 80. The plate 11 rotates about a post 14 on which is mounted a thermostat member 15 shown as generally in the form of a spiral having a centrally depending terminal to which is secured the contact bar 16, which bar is shown as electrically connected to member 15 by the rivets 17. The plate 11 also carries adjacent its lower end a plurality of posts 18 disposed in front of slots 10$^c$ formed in the front of casing 10, whereby conductors may be attached to said posts at the rear of plate 11 and of said casing 10. The bar 16 has contact members 16$^a$, 16$^b$ and 16$^c$ thereon as shown in Fig. 1, adapted at certain times to engage respectively with the pointed ends of the contact screws 19, 20 and 21. It will be noted that bar 16 will move substantially about the axis of post 14 as a center, and that plate 11 is also adjusted about said center. The proper relation of bar 16 and the contacts 19, 20 and 21 on plate 11 is thus not changed.

Figure 5:
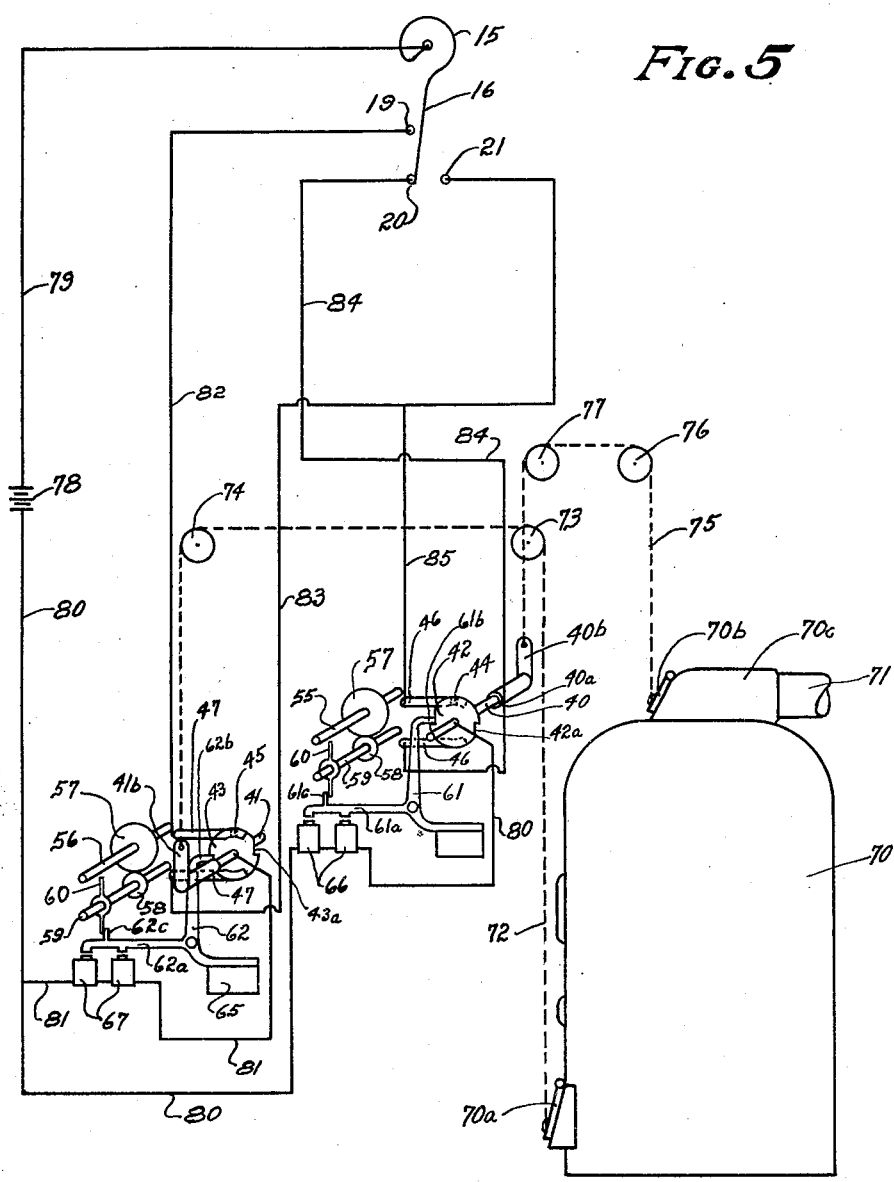
Fig. 5 is a diagrammatic view showing a furnace and the control means therefor.

A motor is used in the device and while various motors might be employed, in the embodiment of the invention illustrated a motor is shown comprising a base 25 having secured at each side thereof the upstanding side plates 26 having the inturned lugs 26$^a$ secured to base 25 by the screws 27. Other plates 28 are also secured to base 25 adjacent the center thereof, also having lugs 28$^a$ thereon which are reversely disposed on said plates respectively, and secured to the base 25 by the screws 29. The plates 26 and 28 are held in properly spaced relation and connected at their upper ends by the spacing members 30, 31 and 32 through which pass the headed and nutted bolts 33 also passing through said plates and having their heads and nuts respectively on the outer sides of the plates 26. A spring drum 34 is provided, in which a coiled clock spring is contained, having one end secured to said drum and its other end secured to a shaft 35 extending axially therethrough and extending through both of the plates 26, said shaft having a portion 35$^a$ angular in cross section at the outer side of said plate 26. The shaft 35 has a ratchet 36 secured thereto adjacent drum 34 with which co-operates a stop pawl 37 pivoted to one side of a gear 38 at one side of said drum. Said drum carries another gear 38 at its side opposite said first mentioned gear, said gears meshing respectively with a pair of pinions 39 mounted upon shafts 40 and 41 respectively, which shafts are journaled in the plates 26 and 28 and each of which has a projecting end 40$^a$ and 41$^a$ respectively at the outer side of the plates 26 which is angular in cross section and adapted respectively to receive operating arms 40$^b$ and 41$^b$ as indicated in Fig. 5. The shafts 40 and 41 have secured thereto respectively the disks 42 and 43, each of which has a button or semi-spherical projection 44 and 45 respectively thereon. The members 44 and 45 are adapted to engage respectively with plates 46 and 47 which are secured to the inner side of the plates 26 respectively and have attaching screws 48 adapted to constitute binding posts for the attachment of an electrical conductor. The shafts 40 and 41 also carry gears 49 meshing with pinions 50, which pinions are secured respectively to a pair of shafts 51 and 52. The latter shafts in turn have secured thereto gears 53 meshing respectively with pinions 54 respectively secured to a pair of shafts 55 and 56, which shafts like the shafts 51 are journaled in the plates 26 and 28 and extend therebetween. The shafts 55 and 56 each have secured thereto a gear 57 which in turn meshes with pinion 58, said latter pinions being secured on shafts 59 also extending respectively between plates 26 and 28 and being journaled therein, which shafts are disposed immediately below the shafts 56 as shown in Fig. 5. The shafts 59 carry members 60 having oppositely extending thin arms adapted to act as stop members. The members 60 co-operate with the arms 61$^a$ respectively of the members 61 and 62 secured to shafts 63 and 64 respectively, which are journaled in the plates 26 and 28 and extend therebetween. The members 61 and 62 have rearwardly projecting arms to which are secured respectively weights 65 and said members also have upwardly projecting arms 61$^b$ and 62$^b$ having inturned lips or terminals engaging the peripheries of the disks 42 and 43 respectively. As shown in Fig. 5, the disks 42 and 43 each have flat portions 42$^a$ and 43$^a$ at opposite sides thereof. The arms 61$^a$ and 62$^a$ of the members 61 and 62 constitute armatures and co-operate with electro-magnets 66 and 67 mounted on the base 25 respectively beneath said arms. The arms 61$^a$ and 62$^a$ have stop members 61$^c$ and 62$^c$ respectively thereon, which co-operate with the members 60.

In operation the motor will be wound by applying a key to the portion 35$^a$ and winding the spring in drum 34. The unwinding of the spring will be prevented by the ratchet 36 engaging pawl 37. The spring in unwinding tends to turn shaft 35 and drum 34 and thus the gears 38. The gear train including gears 49, 53 and 57 with the pinions engaged thereby, are thus normally urged to rotate by shaft 35 and drum 34 respectively to rotate the members 60. The members 60, however, are kept from rotating by engagement with the stops 61$^c$ and 62$^c$ respectively. When the magnets 66 or 67 are energized, the arms 61$^a$ and 62$^a$ will be drawn downwardly, thus removing the stops 61$^c$ and 62$^c$ from the members 60 and allowing the shaft 35, the drum 34 and the various gears and pinions to rotate. The end of the arms 61$^b$ and 62$^b$ move off of the flat portions of the disks 42 and 43 on to the circular portions thereof and thus hold the arms 61$^a$ and 62$^a$ down so that member 60 cannot engage stops 61$^c$ and 62$^c$. When the disks 42 and 43 have made a half-revolution, the ends of the arms 61$^b$ and 62$^b$ will then again engage the flat portions of said disks and arms 61$^a$ and 62$^a$ will rise, thus permitting members 60 to engage the stops 61$^c$ and 62$^c$ and stop the rotation of members 60, shaft 35 and drum 34. An electrical circuit is closed to operate the magnets 66 and 67, which circuit also passes through the plates 46 and 47 as well as the buttons 44 and 45 as will be later described. As shown in Fig. 5, there are two of the plates 47 for each disk 42 and 43 and when said disks make a half revolution, the buttons 44 and 45 move out of engagement with one plate and into engagement with the other. It will be seen that the motor is really a duplex motor and that one of the magnets 60 can be energized to permit rotation of one of the members 60 and one of the disks 42 without rotation of the other member 60 or disk 43. In other words, either half of the motor can operate independently of the other, but both being actuated by the common spring. When stop 61ᶜ is removed the spring revolves drum 34 and gear 38 secured thereto and when stop 62ᶜ is removed the spring rotates shaft 35 and the other gear 38 through the pawl 37 and ratchet 36.

Figure 2:
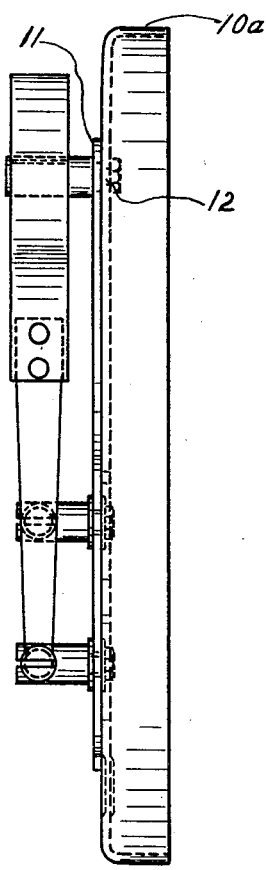
Fig. 2 is a view in side elevation of said thermostat.

In Fig. 5 the thermostat shown in Figs. 1 and 2 and the motor shown in Figs. 3 and 4 are diagrammatically shown with the circuits and the control means for a furnace. While the furnace or heating means may be of various types, in Fig. 5 a furnace 70 is shown, of which it will only be necessary to consider the draft door or damper 70ᵃ and the check door or damper 70ᵇ shown as located in the smoke connection 70ᶜ which is connected to the smoke pipe 71 leading to the chimney. The draft door or damper 70ᵃ is connected to a flexible member such as a chain 72 which runs over pulleys 73 and 74 and is connected to the arm 41ᵇ which is connected to the end 41ᵃ of the shaft 41. The check door or damper 70ᵇ is connected by a flexible chain 75 which runs over pulleys 76 and 77, which chain is connected at its other end to the arm 40ᵇ which is connected to the end 40ᵃ of the shaft 40 of the motor. In Fig. 5 the two parts of the motor are shown separate and it will be seen that only some of the parts are illustrated, the driving elements being omitted. The thermostat 15, contact bar 16 and the contact members 19, 20 and 21 are diametrically shown in Fig. 5. Some suitable source of power indicated as a battery 78 is shown and a conductor 79 extends from one side of the battery 78 to the contact bar 16. A conductor 80 extends from the other side of battery 78 to the magnet 66 and thence to shaft 40 and disk 42, and a conductor 81 shunts from conductor 80 to the magnet 67 and is connected at its other end to the shaft 41 and disk 43. Another conductor 82 extends from one of the arms 47 to the contact 19. A conductor 83 extends from the other arm 47 to the contact 21. Conductor 84 extends from the contact 20 to one of the arms 46 and a conductor 85 extends from the other arm 46 and is connected to conductor 83.

As seen in Fig. 5, the check damper 70ᵇ and the draft door or damper 70ᵃ are both closed. This stage of regulation is reached when the temperature falls below the desired temperature in the room. Assuming that it is desired to have a temperature of 70° in the room and the temperature is 70° or above, the draft damper would be closed and the check damper would be opened. If now the temperature falls below 70°, the furnace will be brought to the position shown in Fig. 5.

It will be seen from Fig. 5 that the button 44 is now at the top of disk 42 and in engagement with upper arm 46. Just before the stage shown in Fig. 5 is reached, or when the check damper 70ᵇ was opened, disk 42 was in a position 180° from the position shown and arm 40ᵇ extended downwardly. When the temperature dropped below 70°, the arm 16 moved into engagement with the contact 20 and a circuit was closed from the battery through conductors 79 and arm 16, conductor 84 to lower arm 46 with which button 44 was then in contact, through disk 42 and shaft 40, thence through conductor 80 through magnet 66 to the other side of battery 78. When this circuit was closed, magnet 66 was operated and arm 61ᵃ drawn downward. This removed stop 61ᶜ from member 60 and moved the upper end of arm 61ᵇ some distance away from disk 42. The motor was now released to be operated by the spring and shaft 40 was turned and through the gears already described, shafts 55 and 59 were rotated. As soon as disk 42 has rotated a short distance, button 44 is moved out of engagement with arm 46 and the circuit described is broken. The end of arm 61ᵇ rides on the periphery of the cam 42 and arm 61ᵃ was prevented from being raised by weights 65, owing to this engagement. When disk 42 thus made a half-revolution, the end of arm 61ᵇ moved into one of the flat places 42ᵃ and arm 61ᵃ was allowed to rise so that member 60 again engaged stop 61ᶜ and the motor was stopped with arm 40ᵇ in the position shown. Arm 40ᵇ moving from its downward to its upward position, closed the check door 70ᵇ. Disk 42 having made a half-revolution, button 44 moved into contact with the upper arm 46 as shown in Fig. 5.

Should the temperature continue to fall, arm 16 is moved farther to the left as shown in Fig. 5, said arm being quite flexible and resilient and contact is made between said bar or its contact member 16ᵃ and contact 19. A circuit is now closed from battery 78 through conductors 79 and arm 16 to contact 19, thence through conductor 82 to the upper arm 47, button 45, disk 43, shaft 41, and conductor 81, magnet 67 and conductor 80 to battery 78. The magnet 67 is energized and arm 62ᵃ is drawn downwardly. Stop 61ᶜ will be moved out of the path of member 60 and the motor will be free to rotate. As before described, the upper end of arm 62ᵇ will move in engagement with the periphery of disk 43 which acts as a cam so that arm 62ᵃ will be prevented from being moved upwardly by its weights 65. After disk 43 has made a half-revolution, the upper end of arm 62ᵇ again drops into the flat place in said disk, allowing arm 62ᵃ to move upward so that stop 62ᶜ is moved into the path of member 60 and the motor again stops. Disk 43 and shaft 41 thus will make a half-revolution and arm 41ᵇ will be moved 180° so as to extend downwardly. This movement will pull on chain 72 and will open the draft damper 70ª. The furnace is now in the stage with the damper 70ª opened and check 70ᵇ closed. The furnace is thus opened and the temperature will again rise in the room. When the temperature rises above 70°, the thermostat will expand and arm 16 will be moved into engagement with contact 21. A circuit will thus be closed which may be traced from battery 78, conductor 79, arm 16 and contact 21, thence through conductors 83, 85, to upper arm 46, button 44, which is in engagement therewith, disk 42 and shaft 40, conductor 80, solenoid 66 and to battery 78. The motor will now be released for movement and disk 42 will rotate through another 180°, moving arm 40ᵇ 180° so that it will extend downward. This pulls on chains 75 and opens the check damper 70ᵇ. When arm 16 engages contact 21, a circuit is also closed, which may be traced from contact 21 through conductor 83 to lower arm 47 with which button 45 is now in contact, thence through disk 43 and shaft 41, conductor 81, magnet 67 and conductor 80 to the battery. Magnet 67 is energized and arm 62ª pulled downward, so that the motor is again allowed to run. The disk 43 will rotate through 180°, moving arm 41ᵇ 180° so that it is again projected upwardly to the position shown in Fig. 5. This moves chain 72 so that damper 70ª can close by gravity. When contact 21 is engaged, therefore, by arm 16, the check damper 70ᵇ is opened and the draft damper 70ª is closed. Thus, after the temperature rises sufficiently, the furnace is brought to the fourth stage, with the draft closed and the check open. This condition will be maintained until the temperature again drops below 70°, when arm 16 will move into engagement with contact 20 and the furnace will be brought to the stage shown in Fig. 5, which operation has already been described. The cycle of regulation as described is therefore from the first stage with the draft closed, and the check open, to the second stage, with the draft and the check closed then to the third stage with the draft open and the check closed and then back to the first stage with the draft closed and the check open.

It will be understood that the cycle described in the operation of the apparatus need not always be followed as set forth. When the check is closed in the first stage or operation of the apparatus, the temperature in the room may rise sufficiently so that the contact bar 16 will not move into contact with contact 19, but will move away from contact 20. If the temperature should rise sufficiently, it will move into engagement with contact 21 so that the motor will be actuated to open check damper 70ᵇ. With such an operation, the draft damper 70ª is already closed, so that the check alone will be operated. The invention, therefore, contemplates an apparatus and method for regulating a furnace in which only a check damper is operated. At certain times, as in the fall and spring, when little heat is required, such a regulation is sufficient to give the desired results. In fact, the chain 72 can be disconnected from the draft damper 70ª and said damper left in one position. The apparatus will then function to operate only the check damper.

The method of regulation also contemplates a cycle which may include an intermediate stage of having the draft closed and the check closed after the stage when the draft is opened and the check closed. In other words, when the draft is opened and the check closed, and the furnace is increasing the heat to raise the temperature to the desired point which has been assumed as 70° and this temperature is reached, the draft may merely be closed instead of both closing the draft and opening the check. With such a regulation the cycle could be expressed as follows:—

| Draft | Check |
|---|---|
| 1. Closed | Open |
| 2. Closed | Closed |
| 3. Open | Closed |
| 4. Closed | Closed |
| 5. Closed | Open |

The cycle performed by the apparatus described is the same as that given above, except that the fourth step is omitted and a direct change made to the fifth step.

From the above description it is seen that the applicant has provided a novel and efficient apparatus regulating a furnace or heating plant. Careful tests made in actual practice have shown that a great saving of fuel is effected by using the intermediate step of the closed draft and closed check. In every case, it was shown that there was a decided drop in the amount of the heat wasted through the stack since the fuel is allowed to burn at a slower rate which is made possible by closing the draft with the check also closed. This manner of burning the fuel has the advantage of having a high percentage of carbon dioxide, while the carbon monoxide content of the flue gases is kept to a minimum. The fire temperature is raised, thus transferring a greater number of heat units into the heating medium.

With the check closed and the draft closed, the combustion is slower and more complete than when the check is closed with the draft open.

As stated above, the broad concept of the invention is that of regulating the check damper automatically without changing the draft damper. As above set forth, this will be done by the apparatus when the temperature rises sufficiently upon the closing of the check. In very cold weather the stage of opening the draft will also be used. The invention, as stated, has been amply demonstrated in actual practice.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. An apparatus for regulating a furnace having a draft damper and check damper, having in combination, a thermostat, means controlled by said thermostat upon a lowering of the temperature below a certain point in a room to be heated for closing said check damper, means controlled by said thermostat for opening the draft damper upon the further lowering of said temperature, and means for closing said draft damper and opening said check damper upon the temperature rising beyond said point.

2. An apparatus for regulating a furnace having a draft damper and a check damper, having in combination, a thermostat having a contact arm, three contact members adapted to be engaged by said arm, circuits respectively closed by engagement of said arm, and contact members, a motor controlled by the closing of said circuits, a connection from said motor to said draft damper, a connection from said motor to said check damper, means on said motor for closing said check damper when one of said circuits is closed, and means for opening said draft damper when another of said circuits is closed, and means including said means operating to close said draft damper and open said check damper when the other of said circuits is closed.

3. An apparatus for regulating a furnace having a draft damper and a check damper, having in combination, a thermostat, a contact arm movable thereby and a plurality of contacts adapted to be alternately engaged by said arm, a motor controlled by said thermostat, means connecting said motor to said draft damper, means connecting said motor to said check damper, three circuits adapted separately to be closed by engagement with said arm and contacts respectively, said motor operating to close said check damper, to open said draft damper, and to close said draft damper and open said check damper upon closing of said respective circuits.

4. An apparatus for regulating a furnace having a draft damper and a check damper having in combination, a thermostat, a contact arm, two switches actuated by said motor, connections from said motor to said draft damper, connections from said motor to said check damper, circuits respectively including said switches adapted to be closed by each of said contacts when engaged by said arm, means on said motor for closing said check damper while said draft damper is closed, and for moving one of said switches to another position when one of said circuits is closed, means for opening said draft damper with said check damper closed, and moving the other switch to another position when another of said circuits is closed, said means operating to close said draft damper and open said check damper and move both switches to another position when the third of said circuits is closed.

5. An apparatus for regulating a heating means having a draft damper and a check damper having in combination, a motor, means connecting said motor to said draft damper, means connecting said motor to said check damper, and automatic means controlled by the temperature in the room to be heated, for operating said motor to close and open said check damper without operating said draft damper.

6. An apparatus for regulating a heating means having a draft damper and a check damper having in combination, a motor, means connecting said motor to said draft damper, means connecting said motor to said check damper, and automatic means controlled by the temperature in the roof to be heated for operating said motor to close said check damper with said draft damper closed upon said temperature falling below a certain point, for opening the draft damper if the temperature falls to a lower point, and for closing said draft damper and opening said check damper when the temperature rises above a certain point.

7. An apparatus for regulating a heating means having a draft damper and a check damper having in combination, means for moving said draft damper, means for moving said check damper, an automatic means controlled by the temperature in the room to be heated for operating said second mentioned means to close said check damper with said draft damper closed upon said temperature falling below a certain point and for operating the said first mentioned means to open said draft damper if the temperature falls to a lower point and for closing said draft damper and to open said check damper when the temperature rises above a certain point.

8. An apparatus for regulating a heating means having a draft damper and a check damper having in combination, an operating member, means connecting said operating member to said draft damper, means connecting said motor to said check damper, a thermostat, a contact arm movable thereby, three contacts adapted to be alternately engaged by said arm, circuits separately closed by engagement of said arm and contacts respectively, electrical magnetic means for starting said operating member for closing said check damper when one of said circuits is closed, means limiting operation of said operating member to one-half revolution, means for starting said operating member to open said draft damper when another of said circuits is closed, said operating member again making a one-half revolution, and means for operating said operating member to close said draft damper and open said check damper when another of said circuits is closed, said operating member again making one-half revolution.

In testimony whereof I affix my signature.

CLIFFORD M. AKINS.